United States Patent

[11] 3,611,094

[72] Inventor Leo E. Bischoff
 Centerville, Ohio
[21] Appl. No. 55,762
[22] Filed July 17, 1970
[45] Patented Oct. 5, 1971
[73] Assignee General Motors Corporation
 Detroit, Mich.

[54] DC MOTOR SWITCHING ARRANGEMENT
 1 Claim, 1 Drawing Fig.
[52] U.S. Cl. ................................................. 318/305,
 318/339, 318/361, 318/443, 318/DIG. 2
[51] Int. Cl. ................................................. H02p 7/08
[50] Field of Search ........................................... 318/272,
 305, 361, 443, 339, DIG. 2

[56] References Cited
 UNITED STATES PATENTS
 3,091,128  5/1963  Derees et al. ................  318/DIG. 2
 3,411,064  11/1968  Mellor ...........................  318/339

*Primary Examiner*—Oris L. Rader
*Assistant Examiner*—K. L. Crosson
*Attorneys*—E. W. Christen and C. R. Meland ABSTRACT: A switching arrangement for controlling the operation of a two-speed three-brush DC motor in a motor vehicle windshield wiper system. This switching arrangement utilizes two electrical relays in conjunction with a selector switch to determine the energization of the three brushes of the DC motor. A cam-actuated switch provides a park function to terminate motor operation and dynamically brake the motor at the end of an operating interval.

PATENTED OCT 5 1971 3,611,094
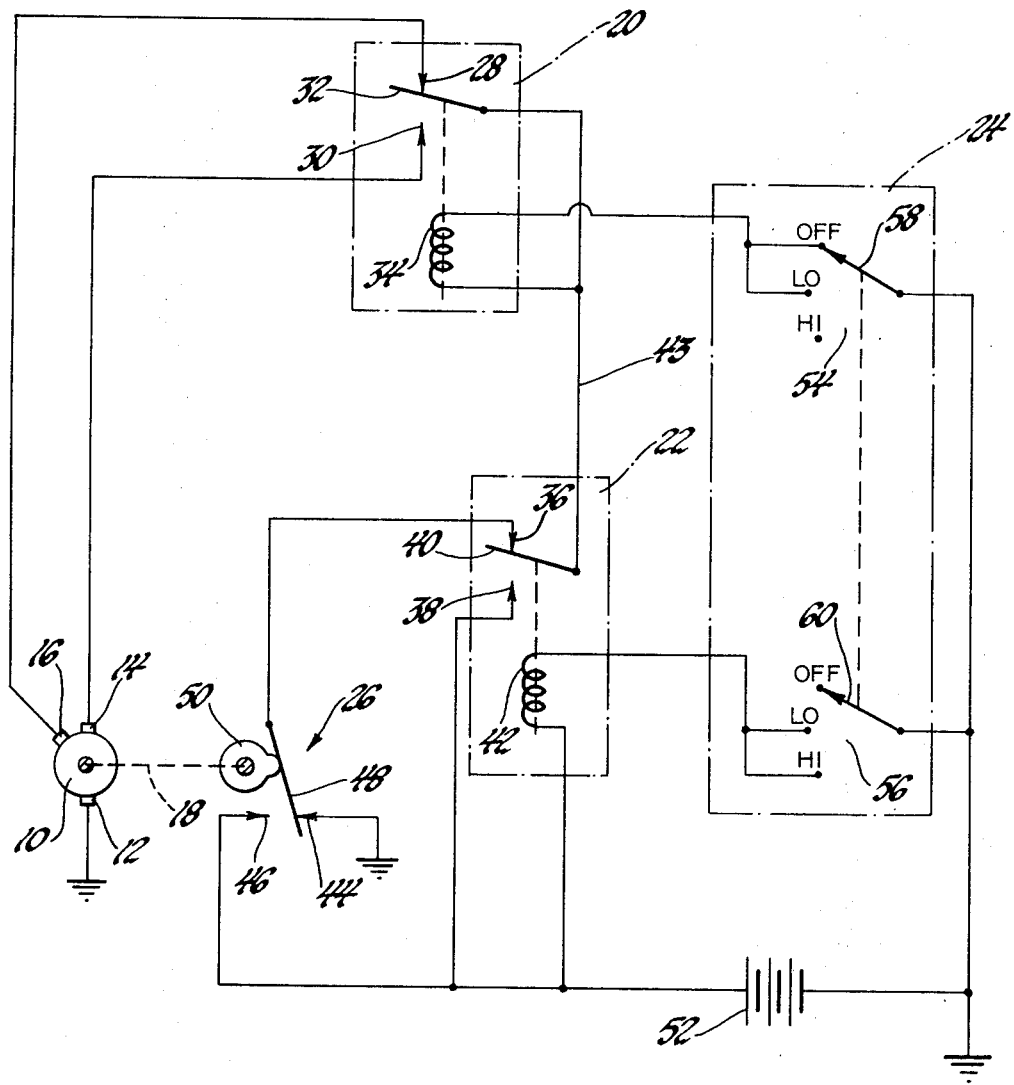
INVENTOR.
Leo E. Bischoff
BY
C.L. Meland
ATTORNEY

DC MOTOR SWITCHING ARRANGEMENT

This invention relates to a switching arrangement for controlling a two-speed three-brush DC motor in a windshield wiper system.

In motor vehicle windshield wiper systems, it is desirable to minimize the number of electrical wires required for connection with the operator control selector switch. In this manner, the number of wires to be carried in a wiring harness fed through various vehicle body parts is minimized. The present invention provides a switching arrangement utilizing electrical relays in conjunction with a selector switch to effect control of a two-speed three-brush DC motor with a minimum number of conductors connected with the selector switch. The relays of the control arrangement can be mounted in proximity with the DC motor thus limiting total wiring length.

Accordingly, it is an object of the present invention to provide a switching arrangement for controlling the operation of a two-speed three-brush DC motor in a motor vehicle windshield wiper system wherein the number of wires required for connection with the operator control selector switch is reduced to a minimum.

Another object of the present invention is to provide a switching arrangement for controlling the operation of a two-speed three-brush DC motor in a windshield wiper system of the type described wherein a park function is provided which includes means for dynamically braking the DC motor at the end of an operating interval.

Additional objects and advantages of this invention will be apparent in light of the following description. The accompanying single FIGURE drawing clearly shows the preferred embodiment of the present invention.

In the single FIGURE drawing, a switching arrangement is shown for controlling the operation of a two-speed three-brush DC motor in a windshield wiper system in accordance with the present invention.

Referring now to the drawing, a two-speed DC motor 10 is shown having first, second and third electrical brushes 12, 14 and 16 that control the commutator of an armature of the motor which is not illustrated. This DC motor has a permanent magnet field which is not illustrated. The DC motor has two output speeds and the armature of the motor is mechanically connected to a windshield wiper linkage represented by dotted line 18. Linkage 18 is of any conventional design and forms no part of the present invention; accordingly, it is not shown in detail. It is understood, however, that linkage 18 drives the wiper blades on a motor vehicle. The motor 10 is of a conventional three-brush type wherein low-speed operation obtains when brushes 12 and 14 are energized and high-speed operation results from energizing brushes 12 and 16. To control the speed of operation of the DC motor 10, first and second relay means 20 and 22, selector switch 24, and cam-actuated parking switch 26 cooperate to determine the energization of the three brushes of the motor 10 in a manner as set forth more fully below.

It is noted that relay 20 has two fixed contacts 28 and 30 and a movable contact 32 movable between the two fixed contacts 28 and 30. Actuating coil 34 of relay 20 controls the movement of the movable contact 32. The movable contact 32 normally engages fixed contact 28 and may be biased to this position by a spring which is not illustrated. Movable contact 32 is moved into engagement with fixed contact 30 upon energization of actuating coil 34. As shown in the drawing, brushes 14 and 16 are conductively connected with fixed contacts 30 and 28, respectively. Thus, it is seen that the movable contact 32 of relay 20 is connected with one of the two motor brushes 14 or 16 depending on whether or not actuating coil 34 is energized.

The relay 22 has two fixed contacts 36 and 38 and a third movable contact 40 movable between the two fixed contacts of the relay. Actuating coil 42 of relay 22 controls the position of the movable contact 40. Movable contact 40 is spring biased into engagement with fixed contact 36 so that it normally engages fixed contact 36 and is moved into engagement with fixed contact 38 upon the energization of actuating coil 42. A conductor 43 interconnects movable contact 32 of relay 20 with movable contact 40 of relay 22.

The cam-actuated parking switch 26 has two fixed contacts 44 and 46 and a third movable contact 48. As shown in the drawing, fixed contact 36 of relay 22 is connected with movable contact 48 of cam-actuated switch 26. The movable contact 48 of cam-actuated switch 26 is spring biased such that it normally engages fixed contact 46 and it is forced into engagement with fixed contact 44 by the lobe of cam 50. Cam 50 is connected with the wiper linkage 18 in a manner such that the cam's lobe causes movable contact 48 alternately to engage fixed contacts 44 and 46 during low-speed or high-speed operation and to engage fixed contact 44 when the wiper linkage is in the park position and the windshield wipers are parked. The cam-linkage arrangement is of conventional design generally known in the art of windshield wiper controls and inasmuch as it forms no part of the present invention, it is not shown nor described in detail. If the windshield wiper system includes provision for a recessed park, as in "hidden" wiper systems, a second park linkage is included to drive the wipers to the recessed park position. In these systems, a solenoid or other electromechanical or purely mechanical means is used to change linkage tracks when the selector switch is moved to its off position at the end of an operating interval. For wiper systems of this type, the cam switch 26 of the drawing would be coupled to the park linkage and would, accordingly, be actuated only when the wipers were parked. These arrangements which are not illustrated are generally known in the art of windshield wiper drives.

A source of direct voltage, represented in the FIGURE as a DC battery 52, provides the requisite DC power to drive the DC motor 10. The fixed contact 38 of relay 22 and the fixed contact 46 of cam-actuated switch 26 are connected with the positive terminal of the battery 52. Brush 12 of the DC motor 10 and fixed contact 44 of the cam-actuated switch 26 are connected to ground and therefore with the negative grounded terminal of the battery 52.

The selector switch 24 is comprised of two ganged sections 54 and 56. This switch affords operator control of the windshield wiper system and, accordingly, provides high speed, low speed, and off positions. Each of the two sections 54 and 56 of the selector switch 24 has two fixed contacts. Section 54 has contacts at the OFF and LO positions of the switch 24 and section 56 has contacts at the LO and HI positions of the switch 24. The two sections 54 and 56 have respective movable contacts 58 and 60 connected for concurrent movement among the three positions OFF, LO, and HI and the fixed contacts of each section. The movable contacts 58 and 60 are connected with the negative terminal of battery 52 as shown.

Actuating coil 34 of relay 20 is connected at one end with conductor 43 and at its other end with both the OFF and LO fixed contacts of section 54 of selector switch 24. Actuating coil 42 of relay 22 is connected at one end with the positive terminal of battery 52 and at its other end with the LO and HI fixed contacts of section 56 of selector switch 24.

For low-speed operation, selector switch 24 is positioned such that movable contacts 58 and 60 engage their respective LO fixed contacts. In this manner, actuating coil 42 is energized by the battery 52 through section 56 of the selector switch 24. Movable contact 40 of relay 22 is therefore moved into engagement with fixed contact 38 to connect conductor 44 with the positive terminal of battery 52. With contacts 38 and 40 engaged, actuating coil 34 is energized through section 54 of selector switch 24 to cause contacts 30 and 32 to engage. In this manner, the motor is energized for low-speed operation through a circuit that can be traced from the positive terminal of battery 52 including: the engaged contacts 38 and 40 of relay 22, conductor 43, the engaged contacts 30 and 32 of relay 20, brush 14 of DC motor 10, the armature windings of motor 10, and brush 12 of DC motor 10 to the grounded negative terminal of battery 52.

For high-speed operation, selector switch 24 is positioned such that movable contacts 58 and 60 engage their respective HI fixed contacts. Actuating coil 42 is energized by the battery 52 during high-speed operation causing movable contact 40 to engage fixed contact 38. Since the HI position of section 54 of selector switch 24 is not connected with actuating coil 34, it should be appreciated that movable contact 32 engages fixed contact 28 during high-speed operation. It can be seen that with these connections, brushes 12 and 16 are energized when the selector switch 24 is in the HI position, thus providing high-speed operation of the DC motor 10.

During high-speed and low-speed operation, the presence of cam-actuated switch 26 is of no significance since coil 42 is energized when section 54 of switch 24 is in the LO or HI positions. When it is desired to shut the wipers off, the selector switch 24 is returned to the OFF position and cam-actuated switch 26 is effective to provide a park function. If the wipers are in any position other than their parked position, the motor will continue to operate at low speed. It is noted that the recessed park wiper system noted above will always require continued low-speed operation to drive the wipers to the parked position. The motor operates at low speed since movable contact 48 of cam-actuated switch 26 engages fixed contact 46 to energize actuating coil 34 of relay 20 through the contacts 36 and 49 of relay 22 and the OFF-movable contact 58 connection of section 54 of selector switch 24. Thus, movable contact 32 of relay 20 engages fixed contact 30 to provide DC power to brushes 12 and 24 of DC motor 10 until the cam causes movable contact 48 to engage fixed contact 44. When the linkage assumes its park position and the wipers are parked, the lobe of cam 50 causes movable contact 48 to engage fixed contact 44, thus terminating the supply of electrical energy to motor 10 from battery 52, deenergizing actuating coil 34 of relay 20, and completing a dynamic braking circuit for the DC motor 10. The dynamic braking circuit which is completed includes fixed contact 44 and movable contact 48 of cam-actuated switch 26, fixed contact 36 and movable contact 40 of relay 22 fixed contact 28 and movable contact 32 of relay 20, and brushes 12 and 16 of DC motor 10. In this manner, the supply of power is automatically terminated and the motor is dynamically braked at the termination of an operating interval when the wipers are shut off by moving selector switch 24 to the OFF position.

I claim:

1. A switching arrangement for controlling the operation of a two-speed DC motor in a windshield wiper system, comprising: a DC motor having first, second and third brushes, said DC motor providing high-speed operation when said first and said third brushes are energized and low-speed operation when said first and said second brushes are energized, a first electrical relay means having an actuating coil and first and second fixed contacts and a third contact movable between said first and second fixed contacts, means connecting said third motor brush and said second motor brush respectively with said first fixed contact and said second fixed contact of said first electrical relay means, said movable contact of said first electrical relay means being normally in contact with said first fixed contact and being moved into engagement with said second fixed contact when said actuating coil of said first electrical relay means is energized, a second electrical relay means having an actuating coil and first and second fixed contacts and a third contact movable between said first and second fixed contacts, means connecting said movable contact of said first electrical relay means with said movable contact of said second electrical relay means, a parking switch means having first and second fixed contacts and a third contact movable between said first and said second fixed contacts, said movable contact of said parking switch means connected with said first fixed contact of said second electrical relay means, a source of direct voltage having first and second terminals, means connecting said first terminal of said source of direct voltage with said second fixed contact of said second electrical relay means, said movable contact of said second electrical relay means being normally in contact with said first fixed contact and being moved into contact with said second fixed contact when said actuating coil of said second electrical relay means is energized, means connecting said first fixed contact of said parking switch means with said second terminal of said source of direct voltage, said second fixed contact of said parking switch means connected with said first terminal of said source of direct voltage, wiper linkage connected with said DC motor, means connecting said parking switch means with said wiper linkage, said movable contact of said parking switch means being moved into contact with said first fixed contact when the wiper linkage is in the park position, a selector switch having first and second switching sections, said selector switch providing high speed, low speed and off positions, each section of said selector switch having a fixed contact corresponding to at least two positions of the selector switch, each section of said selector switch having a movable contact engageable with respective fixed contacts, said movable contacts being connected for concurrent movement, means connecting each of said two movable contacts of said selector switch with said second terminal of said source of direct voltage, means connecting said off and low-speed contacts of said first section of said selector switch with one end of said actuating coil of said first electrical relay means, means connecting other end of said actuating coil of said first electrical relay means with said movable contact of said first electrical relay means, means connecting said low-speed and high-speed contacts of said second section of said selector switch with one end of said actuating coil of said second electrical relay means, and means connecting the other end of said actuating coil of said second electrical relay means with said first terminal of said source of direct voltage whereby, two-speed operation of said DC motor results from switching said selector switch to determine the energization of said electrical relay means and concurrently said three brushes of said DC motor and a park function including dynamic braking to terminate motor operation is provided when said selector switch is moved to its off position.